Nov. 20, 1951  M. H. TUFT  2,575,538
BALING PRESS WITH EXTENSIBLE AND RESILIENT
NEEDLE DRIVING MEANS
Original Filed May 19, 1945

INVENTOR
MILES H. TUFT
BY
ATTORNEYS

Patented Nov. 20, 1951

UNITED STATES PATENT OFFICE 2,575,538

BALING PRESS WITH EXTENSIBLE AND RESILIENT NEEDLE DRIVING MEANS

Miles H. Tuft, Huntington Park, Calif., assignor to Deere Manufacturing Co., a corporation of Iowa Original application May 19, 1945, Serial No. 594,684, now Patent No. 2,512,754, dated June 27, 1950. Divided and this application October 5, 1946, Serial No. 701,574

5 Claims. (Cl. 100—20)

The present invention relates generally to baling presses and more particularly to presses of the type which have mechanism for automatically tying the bales. This application is a division of my co-pending application, Serial No. 594,684, filed May 19, 1945, which issued on June 27, 1950, as Patent No. 2,512,754.

The principal object of my invention relates to the provision of a novel and improved automatic tying mechanism which is efficient and accurate in operation, but simple and durable in construction. According to the principles of my invention, the bales are bound by wrapping wire around the latter, twisting the two ends of the wire together to make the knot, then bending or kinking the twisted portion of the wire, and severing the wire from the supply coils. Each bale is tied with two loops of wire, which are wrapped around the bale by means of a pair of needles which are inserted through apertures in the bale case at the appropriate time and extend across the bale case to the wire twisting and kinking mechanism at the opposite side.

Inasmuch as the kinking operation must be performed after the twisting is completed, it is evident that the needle holding the wire must be held stationary in tying position for a sufficient interval to permit the twisting and kinking operations to be performed. Therefore, a further object of my invention relates to the provision of needle driving mechanism which provides for such an interval of time in which the needle is held stationary.

In a wire tying mechanism, the needle does not have a sharp point as it does in a twine tying mechanism, but carries a short section of wire stretched across the end of the needle between a pair of spaced pulleys for the purpose of sliding the section of wire into the twisting and kinking mechanism. Therefore, it is important that the movement of the needle and the baler plunger be synchronized in such a manner that the needle be inserted through the bale case at a time when there is no loose hay or other material to be baled in the path of the needle, which would be gathered by the needle and forced into the twisting mechanism, thereby adversely affecting the smooth operation of the mechanism. A further object of my invention therefore has to do with the provision of means for holding the loose hay or other material against the bale while the needle is being moved across the bale case. This is accomplished by providing slots in the working face of the plunger for receiving the needles, the latter being moved through the slots across the bale case while the plunger is in contact with the bale. Obviously, the needle should not start to move into the bale case until the plunger has cleared the loose hay from the opening through which the needle is inserted, and furthermore the needle should travel fast enough across the bale case so that it passes through the opposite wall into the twisting mechanism compartment before the plunger has receded far enough to allow the loose hay to spring back into the path of the needle. It is evident, therefore, that this requires extremely close timing of the needle actuating mechanism, and also requires that the needle be moved at a high rate of speed in order to pass completely through the bale case, all during the short length of time that the plunger is in contact with the material being baled.

A further object of my invention relates to the provision of means by which a slightly greater interval of time can be obtained to move the needle through the bale case, thereby decreasing the possibility of catching hay over the end of the needle and pressing it into the twisting mechanism. In the accomplishment of this object I have provided an extension along the edge of the plunger adjacent the opening in the bale case through which the needle is inserted. As the plunger moves toward the bale this extension moves in advance of the working face of the plunger, carrying the loose hay away from the end of the needle slightly earlier than this would be done by the main body of the plunger, thereby permitting the needle to be inserted an instant earlier than would otherwise be possible, and providing a little more time in which to move the needle to the other side of the bale case before the plunger has receded.

These and other objects and advantages of my invention will be apparent to those skilled in the art after a consideration of the following description, in which reference is had to the drawings appended hereto, in which Figure 1 is a plan view of the top side of a portion of a bale case, showing wire tying mechanism embodying the principles of my invention;

Figure 1:
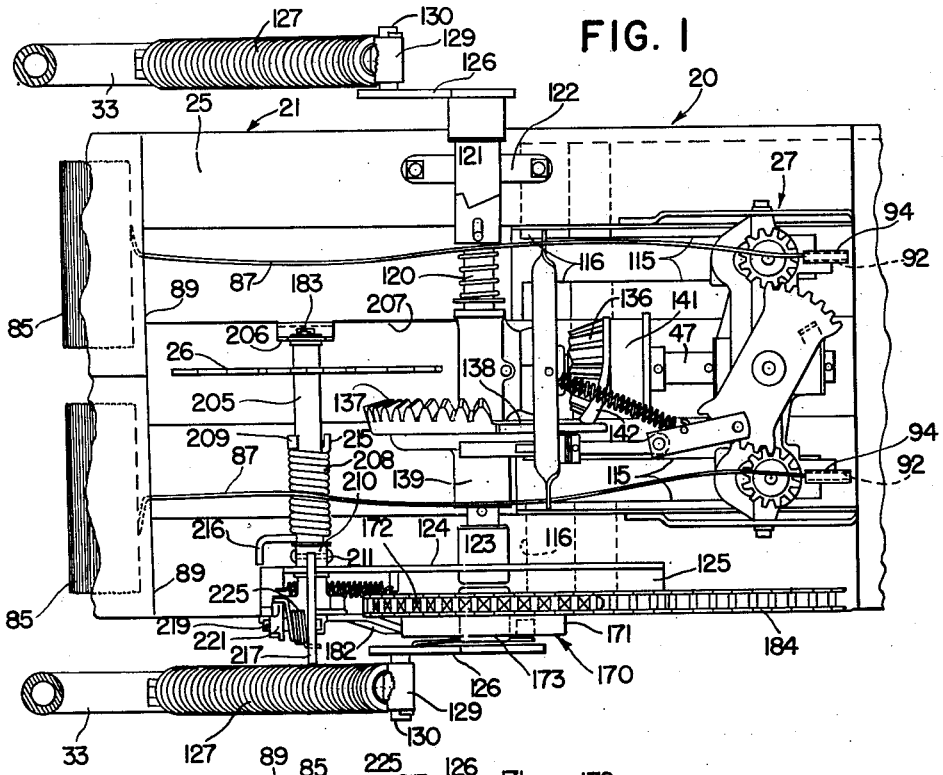

Referring now to the drawings, the baling press is indicated in its entirety by reference numeral 20 and comprises a long rectangular bale case 21, within which is slidably disposed a reciprocating head or plunger 22. The bale case 21 comprises four longitudinally extending angle members 23 which form the four corners of the bale case and support the side walls 24, the top wall 25 and the bottom plate 26. Inasmuch as the baler, with its pickup mechanism, is not part of the present invention, all description thereof is omitted for the sake of simplicity, for the wire tying mechanism which constitutes the present invention can be used with any conventional baling apparatus, except as hereinafter described. It is sufficient to say that the plunger 22 slides through the bale case from right to left, as viewed in the drawings, to compress the hay or other material into a bale, the length of which is indicated by the broken line B. When the bale acquires the predetermined length B, as measured by a serrated measuring wheel 26, the latter initiates the operation of wire tying mechanism, indicated in its entirety by reference numeral 27, which securely binds the bale with a pair of baling wires and begins to form a new bale, which pushes the completed bale toward the left, as viewed in the drawings, discharging the completed bales from the discharge end (not shown) at the left end of the bale case.

Figure 2:
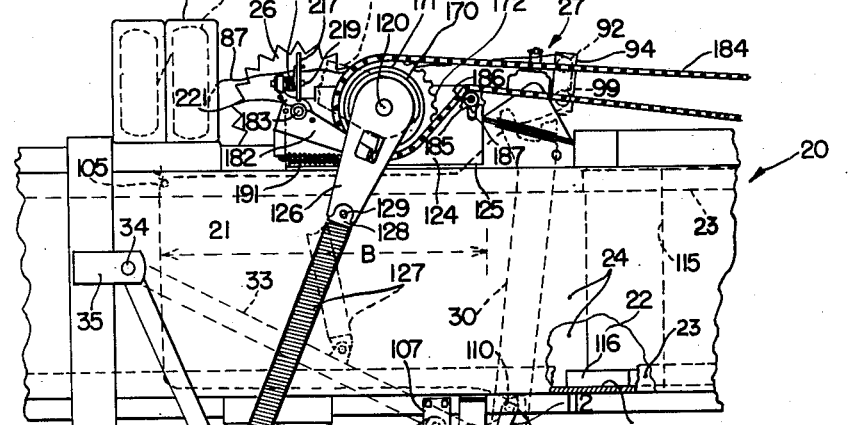
Figure 2 is an elevational view of the bale case and wire tying mechanism, with a portion of the side wall of the bale case broken away to show the construction of the baling plunger, and drawn to a slightly smaller scale.
Figure 3:
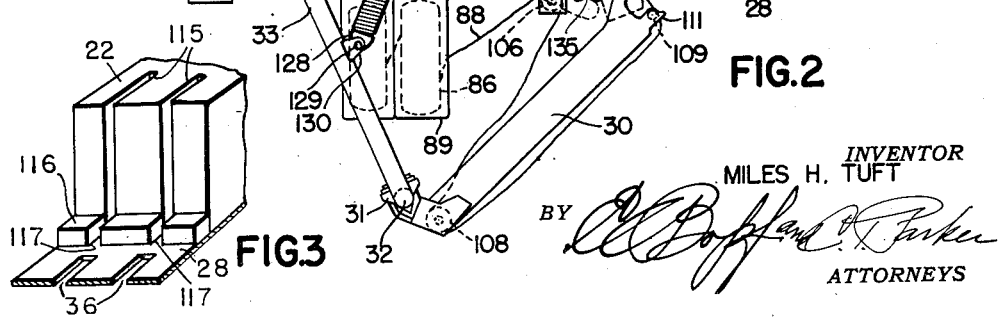
Figure 3 is a fragmentary perspective view of the working face of the plunger as related to the bottom of the bale case.

Cooperating with the tying mechanism 27 is a pair of needles 30, which are rigidly fixed by clamps 31 in laterally spaced relation on a bail 32, which extends transversely beneath the bale case 21 and is provided with a pair of upwardly extending arms 33, which are pivotally connected by a pair of coaxially disposed trunnions 34 to brackets 35 fixed to the two side walls 24 of the bale case, respectively. In Figure 2, the needles 30 and their supporting arms 33 are shown in solid lines in their inactive position with the needles retracted from the bale case 21, and in dotted lines in their tying position, with the needles 30 inserted through the bale case into tying position in cooperative relation with the tying mechanism 27. As best shown in Figure 3, the bottom wall 28 of the bale case is provided with a pair of slots or openings 36 through which the needles 30 are projected and withdrawn.

The wire for each bale tie is fed from a pair of coils of wire 85, 86 above and below the bale case 21, respectively. Hence, since there are two bale ties applied to each bale, there are two upper wires 87 extending from the two upper coils 85 and two spaced lower wires 88 extending from the two lower coils 86. Each of the coils 85, 86 is supported within a generally rectangular container 89 provided with a centrally disposed aperture in one side thereof, through which the wire is drawn. Each of the upper wires 87 extends longitudinally above the bale case 21 and over a suitably grooved sheave 92, journaled in a bracket 94. The wire passes downwardly over the sheave 92 and under a lower sheave 99 journaled in the lower portion of the bracket 94, then passes through the tying and kinking mechanism 27, as explained in detail in my above-mentioned co-pending application. The wire 87 then extends longitudinally through the bale case over the top of the bale B to a knot 105 at the upper left hand corner of the bale, by which the wire 87 is connected to the lower wire 88.

The lower wire 88 is drawn from the coil 86 in the container 89 beneath the bale case 21 and extends around a grooved sheave 106 journaled on a bracket 107 that is bolted to the underside of the bale case 21. The wire 88 extends downwardly from the sheave 106 and under another sheave 108 journaled at the lower end of the needle 30. Passing under the sheave 108 the wire 88 extends upwardly along the needle 30 and over a pair of grooved sheaves 109, 110, which are journaled in the upper end of the needle 30 on a pair of fingers 111, 112, respectively, projecting upwardly at the upper end of the needle. The wire 88 extends longitudinally under the bale from the sheave 110 and upwardly along the far end of the bale to the knot 105.

After the knot 105 is tied at the time of securing the previous bale, the wires 87, 88 extend downwardly from the tying mechanism 27 through the bale case 21 to the needle 30, in a substantially vertical position. The plunger 22 forces the hay or other crop material against the end of the previously formed bale, gradually increasing the size of the bale being formed, and forcing the latter and also the previous bale toward the left, as viewed in the drawings. Inasmuch as the wires 87, 88 extend downwardly between the bales they are forced along the bale case with the bales, drawing the wires of the coils 85, 86 as the bale is formed. When the bale reaches the predetermined length as measured by the measuring wheel 26, the tying mechanism is set into action by tripping mechanism which will be described later, causing the needle supporting bail 32 to swing upwardly in a counterclockwise direction about the pivot axis 34, to the tying position, as indicated in dotted lines in Figure 2, thus bringing the short length of the lower wire 88 between the two sheaves 109, 110 into juxtaposition with a length of the upper wire 87, and the two lengths of wire are engaged by the wire twisting mechanism and twisted together. The twisted section is severed in the center thereof, thereby completing the tying of the bale and at the same time leaving a new knot 105 which ties the upper and lower wires 87, 88 together. Inasmuch as the mechanism for completing the tying operation is not an essential part of the present invention, it will not be repeated herein in detail, but reference may be had for a full description thereof to my patent. After the knot is severed, the needle 30 is withdrawn downwardly through the bale case and a new bale is started by subsequent reciprocation of the plunger head 22.

It is necessary to accurately synchronize, in any well known manner the movement of the needle 30 with the movement of the plunger 22 in order that there will be no interference between them which would cause damage to the needle or other parts of the mechanism. Obviously, it is necessary that the needle be inserted through the bale case at a time when there is no hay in the path of the needles, for otherwise the hay would be gathered on the ends of the needles and forced into the tying mechanism 27 on top of the bale case. Entry of the needles across the bail case while the plunger is compressing the hay is accomplished by providing vertically extending slots 115 in the working face of the plunger 22. The slots 115 are sufficiently large to permit passage upwardly of the two needles 30, but each slot is also narrow enough that they do not accumulate crop material therein as the plunger compresses the material into the bale. Thus, the needles must be inserted through the bale case 21 during the short interval of time that the slots 115 are in alignment with the paths of the needles 30 through the openings 36 in the ball case bottom 28, and the upper ends of the needles must pass through the upper wall of the bale case 21 into the tying mechanism 27 before the plunger has withdrawn from the paths of the needles. By providing an extension on the lower end of the plunger in the form of a ridge or block 116, I have improved this situation by slightly increasing the amount of available time in which to move the needle through the bale case. The extension block is also slotted at 117 (Figure 3) to provide slots in line with the plunger head slots 115, so that by moving over the needles ahead of the main portion of the plunger head 22, the loose hay or other crop is pushed aside, thereby permitting the needles to be started on their movement across the bale case slightly earlier than if the extension block is not present. By starting the upward movement of the needles slightly earlier, the upper ends of the same reach the top of the bale case before the plunger 22 has withdrawn from the needles.

The entire wire tying mechanism 27 including the needles 30 are actuated by power transmitted through a shaft 120, which extends transversely across the top of the bale case 21 and is journaled at one end in a bearing 121 mounted on standards 122 which are bolted to the top of the base case, and journaled in the other end in a bearing 123, which is supported on a vertically disposed longitudinally extending supporting plate 124 having a horizontal flange 125 which is fixed to the top of the bale case 21. A pair of crank arms 126 are fixed to the opposite ends of the shaft 120, respectively, the outer ends of each of the arms 126 being connected with the arms 33 of the bail member 32 by means of a link member 127 in the form of a helical tension spring. Each end of the spring 127 is provided with a fitting 128 attached thereto, which is journaled on a pivot and crank pin 129. One of the crank pins 129 is fixed to the outer end of the crank arm 126 and the other pivot pin is secured to a lug 130 fixed to the needle supporting arm 33. Thus, one revolution of the shaft 120 swings the crank arms 126 at each end thereof in a complete revolution, which acts through the spring links 127 to raise and lower the needle supporting arms 33, thereby causing the needles 30 to be moved upwardly through the bale case 21 and returned to their inactive position.

Obviously, however, the needles 30 must be held in tying position for a sufficient interval of time to enable the tying mechanism to twist the wires together to make the knot, then kink the two portions of the knot and sever the wires at the center of the twisted portions. This interval of time in which the needles are held stationary is obtained by making the arms 126 and links 127 of such length that the needles will be raised to their tying position appreciably before the shaft 120 has made one-half revolution. This position is indicated in dotted lines in Figure 2, in which the transverse portion of the bail 32 has engaged a resilient bumper or stop 135 on the bottom of the bale case. This requires a movement of the arm 126 of approximately ninety degrees or less. Further rotation of the shaft 120 causes the arm 126 to stretch the spring 127, thereby holding the bail 32 against the stop 135 and thus holding the needles 30 in their tying position, while the shaft 120 makes approximately one-half revolution or slightly more, after which the needle supporting bail 32 is turned to the inactive position shown in Figure 2. The period of time during which the shaft rotates through approximately 180 degrees, with the needle 30 in tying position, is ample for the tying mechanism 27 to make the twist and kink and sever the twisted portion.

The twisting mechanism is driven through a drive shaft 47 on which is mounted a beveled pinion 136, which is adapted to mesh with a gear segment 137 of a beveled gear, the gear segment being mounted on a disk 138 carried on a hub 139, which is rigidly fixed on the shaft 120 by means of a key or other suitable means. A hub 141 is fixed to the shaft 47 and is provided with a camming lobe 142, which slidably bears against the disk 138 during the first portion of the revolution of the shaft 120, preventing any rotation of the bevel gear 136 or drive shaft 47. Thus, during the first approximately 90 degrees of movement of the shaft 120, in which the needle is being raised to tying position, the camming lobe 142 is sliding on the face of the disk 138 holding the beveled pinion 136 against rotation, but the disk 138 is cut away adjacent the segment occupied by the gear segment 137, so that when the latter engages the beveled pinion 136, the camming lobe is disengaged from the face of the disk and is free to rotate with the pinion 136. The gear segment 137 extends over approximately ninety degrees of the disk 138, and the relative diameters of the beveled gear 137 and pinion 136 provides for exactly one revolution of the pinion 136 and shaft 47, whereupon the gear segment 137 upon further rotary movement of the disk 138 disengages the pinion 136, and at the same time the camming lobe 142 engages the disk 138 once more to hold the pinion 136 against further rotation.

The power for turning the shaft 120 through one revolution to actuate the tying mechanism is transmitted through a one-revolution, self-interrupting clutch device 170 comprising a continuously rotating element 171 having sprocket teeth 172 around the circumference thereof, and which is carried on a hub 173 journaled on the shaft 120. The normally stationary element of the clutch mechanism comprises the shaft 120 and the arm 126 rigidly mounted thereon, and which lies over the open side of the normally rotating member 171. The clutch mechanism is not described herein in detail, but is actuated by a trip arm 182 which is mounted on a shaft 183, the latter being rockably supported for movement about an axis parallel to the shaft 120 and spaced therefrom. The clutch member 171 is driven at a constant speed by a drive chain 184 which is trained around the sprocket teeth 172 and extends to a suitable drive sprocket (not shown), which is driven by the shaft which drives the plunger 22. An idler sprocket 185 is journaled on a bolt 186, which is secured in verticaly adjusted position in a slot 187 in the plate 124, for the purpose of adjusting the slack in the drive chain 184. The chain 184 drives the sprocket 172 in a clockwise direction, as viewed in Figure 2, and when the trip arm 182 is swung downwardly in a clockwise direction to trip the clutch mechanism, the latter connects the rotating member 171 with the shaft 120, turning the latter in a complete revolution after which the clutch disengages the shaft in a manner well known to those skilled in the art.

The shaft 183 extends through a sleeve 205, which is rotatable thereon, and the end of the shaft 183 is journaled in a bearing 206 in the form of an apertured plate secured to the top of the bale case. The opposite end of the shaft 183 is journaled within an aperture in the vertical plate 124. The sleeve 205 carries the serrated measuring wheel 26, which projects through a slot 207 in the top of the bale case, with the teeth of the wheel 26 in engagement with the bale being formed. A helical spring 208 is coiled about the wheel supporting sleeve 205 between a lug 209 welded to the sleeve 205 and a collar 210 fixed to the shaft 183 by a pin 211. The end of the spring 208 nearest the wheel 26 is turned in an axial direction, as indicated at 215, in register with the lug 209, so that rotation of the wheel 26 rotates the lug 209 into engagement with the end 215 of the spring. The opposite end of the spring is extended tangentially outwardly and has an outer end 216 turned axially and is adapted to engage a trip plate 217. The trip plate 217 is mounted on a supporting pin 219 journaled on a casting 221 which is mounted on the shaft 183. The plate 217 is held in a position in which it can be engaged by the end 216 of the spring 208, by means of a helical torsion spring 225, which is yieldable when the self-interrupting clutch drives the arm 126 into engagement with the trip plate 217 to disengage the latter from the end 216 of the spring 208.

During the baling operation, the bales move toward the left, gradually rotating the measuring wheel 26 in a clockwise direction, thereby rotating the sleeve 205 relative to the shaft 183. By the time the wheel 26 has made nearly a complete revolution, the lug 209 on the sleeve 205 moves into engagement with one end 215 of the spring 208, while the other end 216 of the spring 208 moves into engagement with the trip plate 217. Further rotation of the wheel 26 and sleeve 205 exerts a force through the lug 209 stressing the spring 208 in torsion and exerting a force against the trip plate 217 which tends to swing the arm 182 and shaft 183 in a clockwise direction, which is resisted by a spring 191, connected between the arm 182 and plate 124 to hold the arm 182 in engagement with the clutch mechanism to hold the latter in disengaged position. Movement of the wheel 26, however, builds up a torsional stress in the spring 208 which finally overcomes the tension spring 191, causing the arm 182 to be disengaged from the clutch mechanism, thereby permitting the clutch to become engaged to drive the shaft 120 and arm 126 from the drive chain 184. The arm 126 swings upwardly, engaging the trip plate 217 and disengaging the latter from the end 216 of the spring 208, thereby causing the latter to contract and snap past the trip plate 217, after which a complete revolution of the measuring wheel 26 is required before the trip arm 182 can be again disengaged. This action of the trip plate and spring 208 insures that the tying mechanism will actuate only once, regardless of whether or not the measuring wheel 26 has any movement during the rotation of the clutch.

I claim:

1. In a baling press, the combination of tying mechanism, a needle, a rotatable power transmitting shaft connected to drive said mechanism, an arm fixed to said shaft, a pivotally supported arm on which said needle is mounted, link means connecting said arms, said link means being extensible, and stop means for arresting the movement of said needle carrying arm in a tying position before the power shaft arm has reached its extreme position, whereby said link means is extended during the tying operation, thereby providing an interval in which the needle is held stationary for tying purposes.

2. In a baling press, the combination of tying mechanism, a needle, a rotatable power transmitting shaft connected to drive said mechanism, an arm fixed to said shaft, a pivotally supported arm on which said needle is mounted, extensible resilient means connecting said arms, and stop means for arresting the movement of said needle carrying arm in a tying position before the power shaft arm has reached its extreme position, whereby said resilient means is extended during the tying operation, thereby providing an interval in which the needle is held stationary for tying purposes.

3. In a baling press, the combination of tying mechanism, a needle, a rotatable power transmitting shaft connected to drive said mechanism, an arm fixed to said shaft, a pivotally supported arm on which said needle is mounted, link means connecting said arms to swing said needle carrying arm from an inactive position in which said power shaft arm and said link means are in dead center alignment to a tying position in which said power shaft arm and said link means are approaching dead center alignment, said power shaft arm moving through less than 180 degrees between said positions, and stop means for arresting movement of said needle carrying arm in said tying position, said link means including a coil spring, the length of which changes as said power shaft arm swings through dead center alignment therewith at 180 degrees of movement, thereby providing an interval in which the needle is held stationary for tying purposes.

4. In a baling press, the combination of tying mechanism, a needle, a rotatable power transmitting shaft connected to drive said mechanism, an arm fixed to said shaft, a pivotally supported arm on which said needle is mounted, link means connecting said arms to swing said needle carrying arm from an inactive position in which said power shaft arm and said link means are in dead center extended alignment to a tying position in which said power shaft arm and said link means are approaching dead center overlapping alignment, said power shaft arm moving through less than 180 degrees between said positions, and stop means for arresting movement of said needle carrying arm in said tying position, said link means including a helical tension spring which extends in length to accommodate movement of said power shaft arm through said overlapping dead center alignment, thereby providing an interval in which the needle is held stationary for tying purposes.

5. In a baling press or the like having tying mechanism and driving means therefor, the combination therewith of a needle movable normally in a first complete stroke toward and ending at the tying mechanism and in a return stroke away from the tying mechanism; a drive member connected to the driving means and operating in a first stroke proportionately longer than the first stroke of the needle so as to move normally through a range beyond the end of the first stroke of the needle, and operating also in a return stroke; and power-transmitting means connected between the member and the needle for driving the latter by the former, including a yieldable connection providing for the member to overrun the needle at the normal end of the first stroke of the latter.

MILES H. TUFT.

REFERENCES CITED

The following references are of record in the file of this patent:

UNITED STATES PATENTS

| Number | Name | Date |
| --- | --- | --- |
| 1,053,397 | Jackson | Feb. 18, 1913 |
| 1,075,376 | Pearson et al. | Oct. 14, 1913 |
| 1,726,229 | Kantor | Aug. 27, 1929 |
| 2,446,878 | Kaupke et al. | Aug. 10, 1948 |
| 2,485,001 | Kane | Oct. 18, 1949 |
| 2,497,641 | Vutz | Feb. 14, 1950 |